Oct. 18, 1932.  J. EDGAR  1,883,636
METHOD OF MAKING TOOTHED POWER TRANSMITTING DEVICES
Original Filed Sept. 21, 1929   2 Sheets-Sheet 1
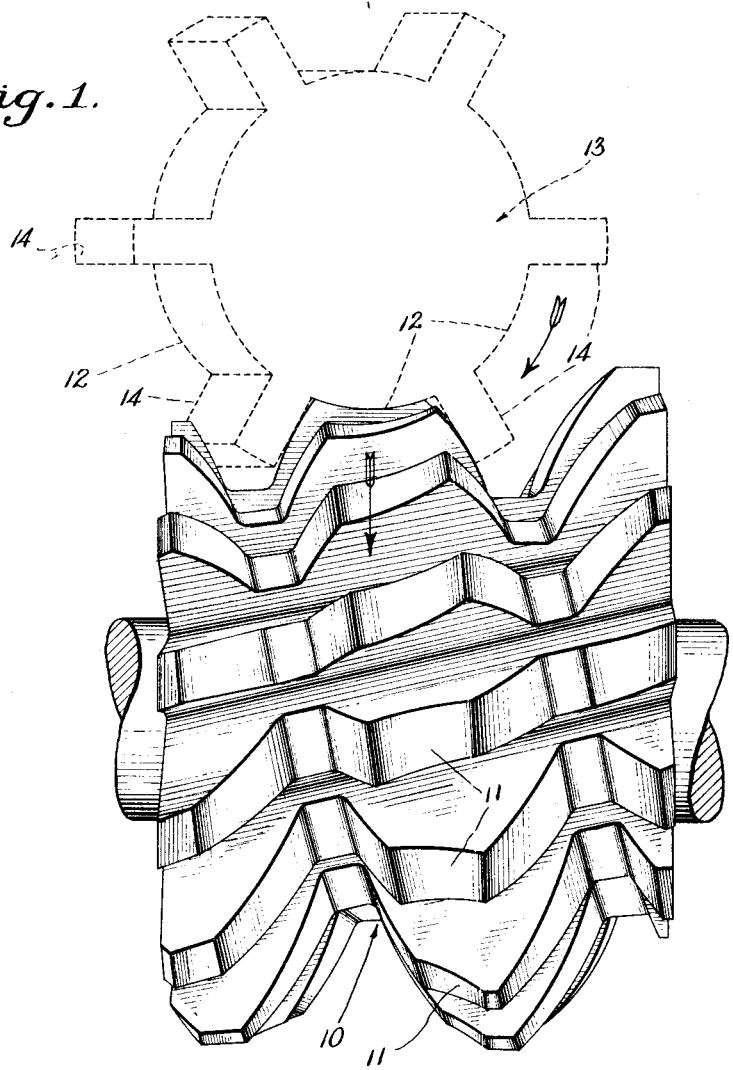
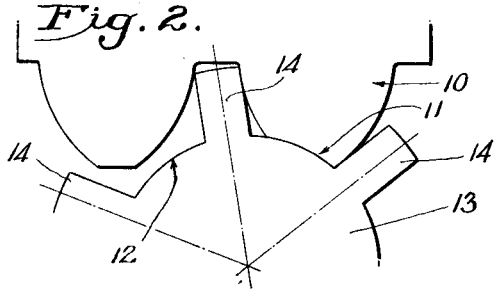
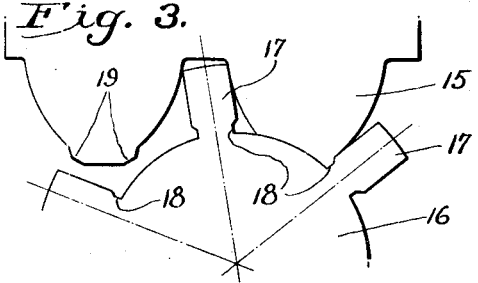
INVENTOR
John Edgar
BY
ATTORNEYS

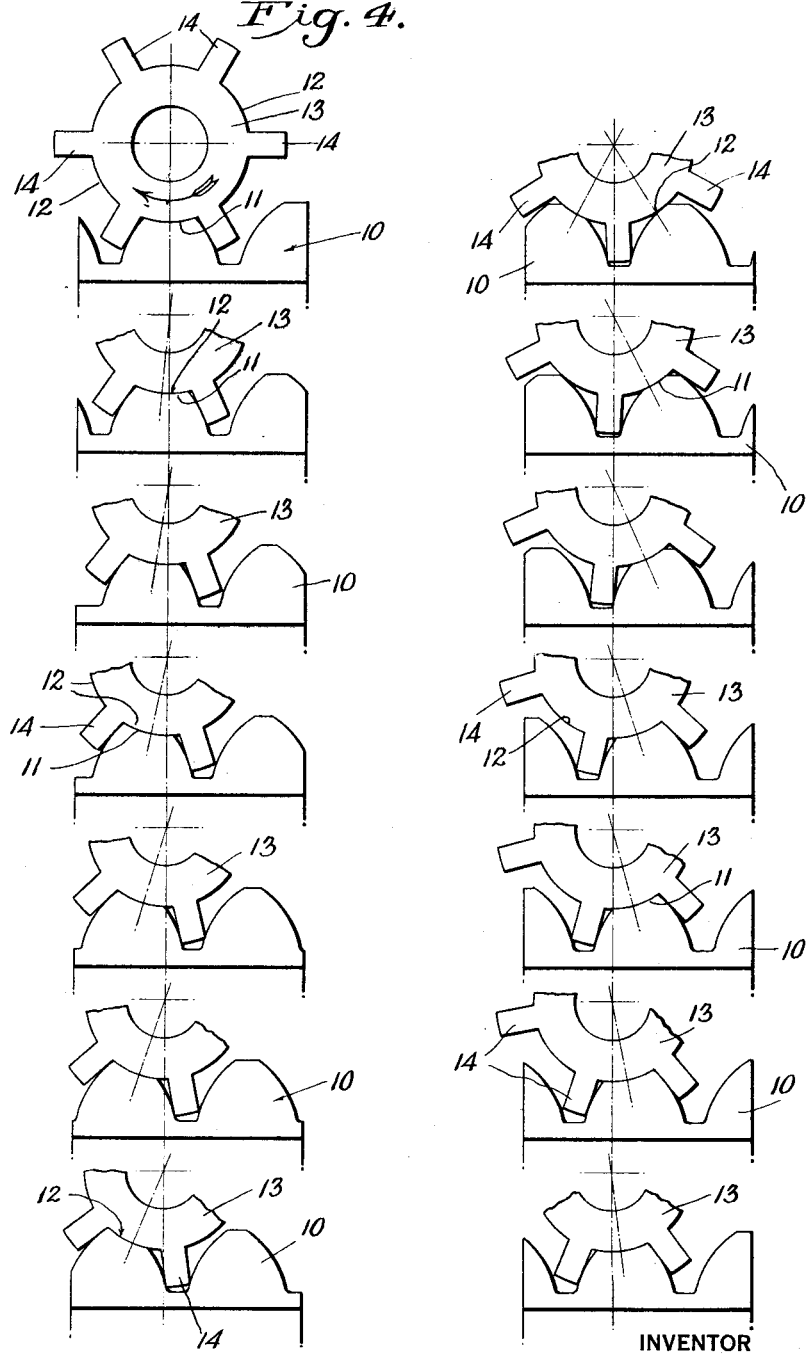

Patented Oct. 18, 1932

1,883,636

UNITED STATES PATENT OFFICE

JOHN EDGAR, OF ROCKFORD, ILLINOIS

METHOD OF MAKING TOOTHED POWER TRANSMITTING DEVICES

Original application filed September 21, 1929, Serial No. 394,161. Divided and this application filed December 24, 1930. Serial No. 504,500.

The invention relates to a method of making toothed power transmitting devices such as spline shafts, ratchets, or the like having straight-sided teeth, this application being a division of my application Serial No. 394,161, filed on September 21, 1929.

Heretofore, toothed power transmitting devices have been made either by a milling process, in which a blank shaft was held against rotation while a relative feeding movement was effected between a formed milling cutter and the shaft axially of the latter and the shaft was indexed at the end of each stroke, or by a hobbing process. Devices produced by the hobbing process have had certain inherent faults which were due partly to the hob construction. These faults were aggravated by the fundamental principle of the process and were especially noticeable when the key depth was great compared with the width of the keys.

The general object of the invention is to provide a novel method of making straight-toothed power transmitting devices such as spline shafts, ratchets, or the like.

Another object is to provide a method of making straight-toothed power transmitting devices which have a relatively great tooth depth compared with the width of the tooth.

A further object is to provide a method of making power transmitting devices having teeth with parallel sides of greater depth than has heretofore been obtainable and with a minimum radius at the root of the keys.

A still further object is to provide a method of making straight-tooth power transmitting devices having sections between the teeth which are more nearly cylindrical than have been obtainable heretofore.

Still another object is to provide a method of making straight-tooth power transmitting devices having abraded teeth without objectionable fillets at the roots thereof.

Other objects and advantages will become apparent from the following description taken in connection with the accompanying drawings, in which:

Figure 1 is a view of a hob and a spline shaft in operative relation to each other.

Fig. 2 is a fragmentary view showing a hob generating a spline shaft.

Fig. 3 is a fragmentary view similar to Fig. 2 but showing a hob generating a modified form of spline shaft.

Fig. 4 is a diagrammatic view illustrating step by step the action of a hob in generating a spline shaft.

For purposes of illustration, I shall describe the invention as used in making the two forms of spline shafts shown in Figs. 2 and 3, but it is to be understood that I do not intend thereby to limit the invention to the making of the specific forms of shafts disclosed nor to the specific method herein disclosed, but intend to cover the making of all modifications of the form of spline shafts and all alternative methods falling within the spirit and scope of the invention as expressed in the appended claims.

The term spline shaft is used herein to designate in general the class of toothed power transmitting devices having straight sides, including ratchets or the like.

When standard hobs are used to generate spline shafts, it is difficult to produce a key which has parallel sides throughout its depth, especially when the depth is relatively great compared to the width of the keys. Spline shafts having keys with parallel sides for a greater depth than are obtainable by the use of a standard hob have been produced by the use of a special form of hob, but such a hob would cut away the root section between the keys to an objectionable extent.

It is the outer end of the hob teeth which are utilized to form the root section between the keys, while the sides of the hob teeth form the parallel sides of the keys. In view of this, it is apparent that it would be advantageous to remove the interfering portion of the hob teeth so that the root section between the keys of a spline shaft would not be cut away more than a desired extent.

In the method herein disclosed, the first step is to provide a hob which is standard in all respects except that the tooth depth is greater than that required to produce a root section of predetermined form, and then remove the interfering portion of the hob teeth.

As shown in the drawings, a standard hob 10 having elongated teeth is provided, and a peripheral groove 11 is cut in the hob, thus removing a portion of the ends of the teeth. The groove 11 has an arcuate contour which, in a plane perpendicular to the helix of the hob, corresponds to the root section 12 of a spline shaft 13 to be cut between the keys 14 thereof. Thus, if the spline shaft has a circular root section, the contour of the groove will be circular in said plane and will be elliptical in a plane including the axis of the hob. In the hob illustrated, the cutting face of each tooth is perpendicular to a tangent to the helix of the hob at that point. Hence, the contour of the groove, in the plane of a tooth face, corresponds to the root section of the shaft.

The hob, so formed, is then rotatably mounted, and a blank shaft is positioned adjacent the hob with its axis parallel to the helix of the hob, or perpendicular to the face of a tooth, if the tooth face is perpendicular to the helix of the hob. If the root section of the spline shaft is to be circular, then the axis of the shaft must pass through the center of the radius of the circular groove taken where the groove is nearest to the axis of the shaft.

A relative rotation betwen the hob and the shaft in timed relation to each other is effected, and also a relative feeding movement therebetween axially of the shaft, so that the keys are cut along the shaft to the desired length.

Figure 3 illustrates a hob 15 generating a modified form of spline shaft 16 on which it is desired to finish the keys 17 by an abrasive operation. Since it is difficult to secure a square corner with an abrasive wheel, the keys 17 are undercut at their roots, as indicated at 18, in order to avoid grinding an objectionable fillet at the tooth root. To undercut the roots of the keys, projecting portions 19 are formed adjacent the top of each tooth of a hob similar to that shown in Figs. 1 and 2, before the groove in the teeth are formed. The portions of the teeth which would interfere with the proper forming of the root section of the spline shaft are then removed by cutting a peripheral groove similar to that shown in Figs. 1 and 2.

After the hob 15 has formed the keys on the spline shaft, the sides of the keys may then be abraded without leaving any objectionable fillets between the keys and the root section.

I claim as my invention:

1. The method of making a spline shaft which comprises rotatably mounting a hob having elongated teeth with a peripheral groove of arcuate contour intersecting said teeth, positioning a blank shaft angularly disposed to said hob and with its axis coinciding with the center of the radius of said groove, and rotating said hob and blank in timed relation to generate the keys.

2. The method of making a spline shaft which comprises providing a hob having teeth with grooves cut therein of elliptical contour in an axial plane, rotatably mounting said hob, rotatably mounting a blank shaft with its axis parallel to the helix of the hob, effecting a relative rotation between said hob and shaft in timed relation to each other, and effecting a relative feeding movement between said hob and said shaft axially of the latter.

3. The method of making a spline shaft which comprises providing a hob having teeth with grooves cut therein of a contour in a plane of the face of a tooth of the hob corresponding to the root section of the spline shaft to be cut, rotatably mounting said hob, rotatably mounting a blank shaft with its axis perpendicular to the face of a tooth of the hob, effecting a relative rotation with said hob and shaft in timed relation to each other, and effecting a relative feeding movement between said hob and said shaft axially of the latter.

4. The method of making a spline shaft which comprises providing a hob having teeth with grooves cut therein of a contour in a plane perpendicular to the helix of the hob corresponding to the root section of the spline shaft to be cut, rotatably mounting said hob, rotatably mounting a blank shaft with its axis perpendicular to said plane, effecting a relative rotation of said hob and shaft in timed relation to each other, and effecting a relative feeding movement between said hob and said shaft axially of the latter.

5. The method of making a spline shaft which comprises providing a hob having elongated teeth with a peripheral groove cut therein, rotatably mounting said hob, rotatably mounting a blank shaft with its axis parallel to the helix of the hob, rotating said hob and shaft in timed relation to each other, and feeding said shaft axially.

6. The method of making a spline shaft having abraded keys which comprises providing a hob having elongated teeth with projecting portions adjacent the top thereof to undercut the keys at the root and with a peripheral groove cut therein to cut root section between the keys, rotatably mounting said hob, rotatably mounting a blank shaft with its axis parallel to the helix of the hob, rotating said hob and shaft in timed relation to each other, and abrading the sides of the keys.

In testimony whereof, I have hereunto affixed my signature.

JOHN EDGAR.

CERTIFICATE OF CORRECTION.

Patent No. 1,883,636.                      October 18, 1932.

JOHN EDGAR.

It is hereby certified that the above numbered patent was erroneously issued to the inventor said "Edgar" whereas said patent should have been issued to "Barber-Colman Company, of Rockford, Illinois, a corporation of Illinois", as assignee of the entire interest in said invention, as shown by the records of assignments in this office; and that the said Letters Patent should be read with this correction therein that the same may conform to the record of the case in the Patent Office.

Signed and sealed this 24th day of January, A. D. 1933.

(Seal)                                                                  M. J. Moore,
Acting Commissioner of Patents.